United States Patent
Sutu et al.

(10) Patent No.: US 6,792,061 B1
(45) Date of Patent: Sep. 14, 2004

(54) HIGH-SPEED BIT-PATTERN DETECTOR

(75) Inventors: Yue-Hong Sutu, Pleasanton, CA (US); Bin Wu, San Jose, CA (US)

(73) Assignee: BitBlitz Communications, Inc., Milpitas, CA (US)

( * ) Notice: Subject to any disclaimer, the term of this patent is extended or adjusted under 35 U.S.C. 154(b) by 647 days.

(21) Appl. No.: 09/643,180

(22) Filed: Aug. 21, 2000

(51) Int. Cl.[7] .............................................. H04L 7/00
(52) U.S. Cl. ..................................................... 375/368
(58) Field of Search ................................. 375/365, 366, 375/368; 708/212, 168, 170, 174, 210, 211; 370/503, 509, 510, 512, 514

(56) References Cited

U.S. PATENT DOCUMENTS

| | | | | |
|---|---|---|---|---|
| 4,730,346 A | * | 3/1988 | Jiang | 375/368 |
| 4,734,676 A | * | 3/1988 | Huon et al. | 340/146.2 |
| 4,748,623 A | * | 5/1988 | Fujimoto | 370/513 |
| 4,768,192 A | * | 8/1988 | Pattavina et al. | 370/466 |
| 4,829,461 A | * | 5/1989 | Hirabayashi | 708/212 |
| 4,829,462 A | * | 5/1989 | Freeman et al. | 708/212 |
| 5,014,272 A | * | 5/1991 | Yoshida | 370/513 |
| 5,140,618 A | * | 8/1992 | Kinoshita et al. | 375/368 |
| 5,608,735 A | * | 3/1997 | McCullough et al. | 370/513 |
| 5,661,763 A | * | 8/1997 | Sands | 375/368 |
| 5,748,688 A | * | 5/1998 | Kim et al. | 375/368 |

* cited by examiner

Primary Examiner—Khai Tran
Assistant Examiner—Khanhcong Tran
(74) Attorney, Agent, or Firm—Edward C. Kwok; MacPherson Kwok Chen & Heid LLP

(57) ABSTRACT

A detector compares a first bit of a bit stream to a first bit of a pattern. If the first bit of the bit stream and the first bit of the pattern are the same, another detector is allowed to read a second bit of the bit stream and compare it to a second bit of the pattern. This continues until all bits of the pattern are detected. By performing the comparison as each bit of the bit stream arrives on a node, the present detectors are able to detect bit patterns in high-speed bit streams.

8 Claims, 17 Drawing Sheets

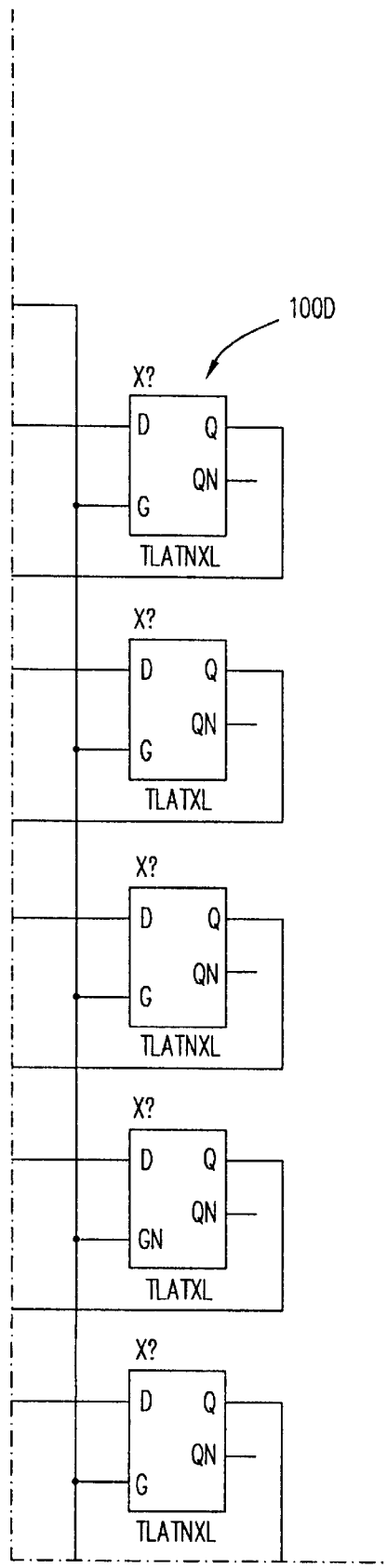
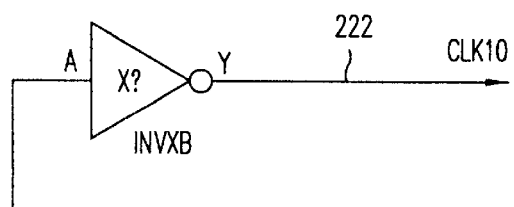
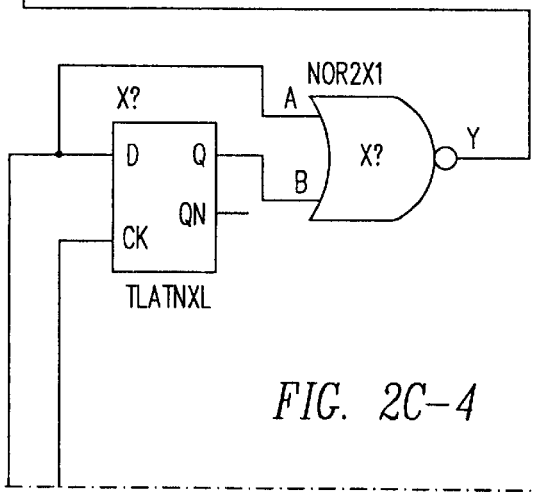
*FIG. 2C-4*

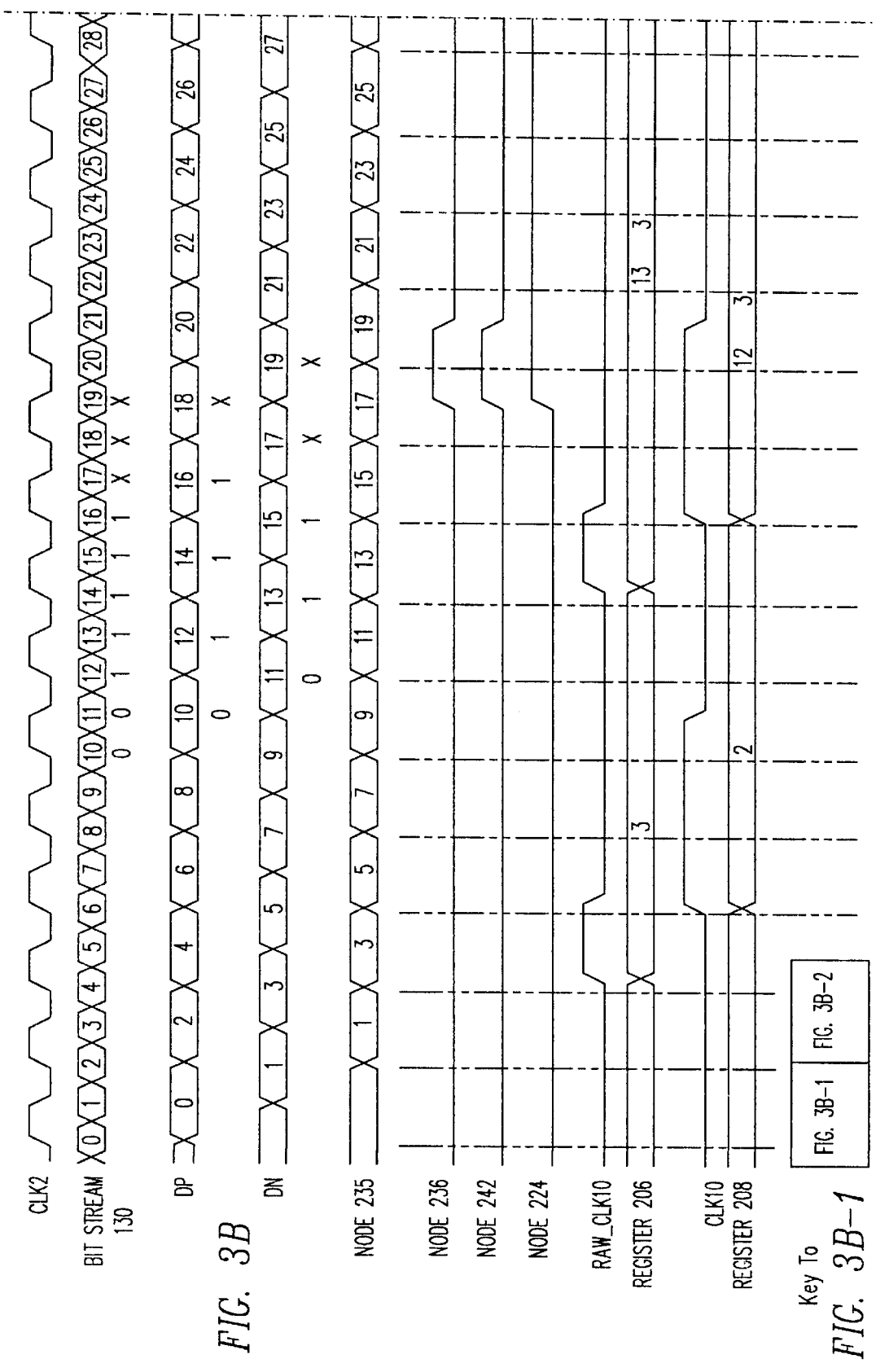

HIGH-SPEED BIT-PATTERN DETECTOR

BACKGROUND OF THE INVENTION

1. Field of the Invention

This invention generally relates to digital electronics and more particularly to methods and associated circuits for detecting bit patterns.

2. Description of the Related Art

A bit stream consists of serially transmitted digital data bits. A specific sequence of bits, also known as a bit pattern, has special significance in some bit streams. For example, a bit pattern "10101010" can indicate that the next following bits in the bit stream constitute a distinct block of information.

Detecting bit patterns in a high-speed bit stream is specially challenging because pattern detection needs to be performed while the bit stream passes at a high rate. Thus, the pattern detector must be fast enough to keep up with the high speed bit stream, which can have rates of 1 Gbit/s (1 Giga bit per second) and higher.

From the foregoing, a method and associated circuits for detecting bit patterns in a high-speed bit stream is highly desirable.

SUMMARY

A first single-bit detector reads a first bit of a serial bit stream and compares it to a first bit of a pattern. If the first bit of the bit stream and the first bit of the pattern have the same logical value, a second single-bit detector is enabled to read a second bit of the bit stream. The second single-bit detector then reads the second bit of the bit stream and compares it to a second bit of the pattern. N single-bit detectors are employed to detect an N-bit pattern. The aforementioned reading and comparison actions continue until all bits of the pattern are detected. By performing the comparison as each bit of the bit stream arrives at a node, the present single-bit detectors can be used in a pattern detector to detect bit patterns in high-speed bit streams.

In one embodiment, the first single bit detector and the second single bit detector are synchronized using different portions of a clock signal to lower the clock frequency requirement of the pattern detector.

These and other features of the present invention will be apparent to a person of ordinary skill in the art upon reading the following description and figures.

BRIEF DESCRIPTION OF THE DRAWINGS

The use of the same reference symbol in different figures indicates the same or identical elements.

DETAILED DESCRIPTION

Figure 1A:
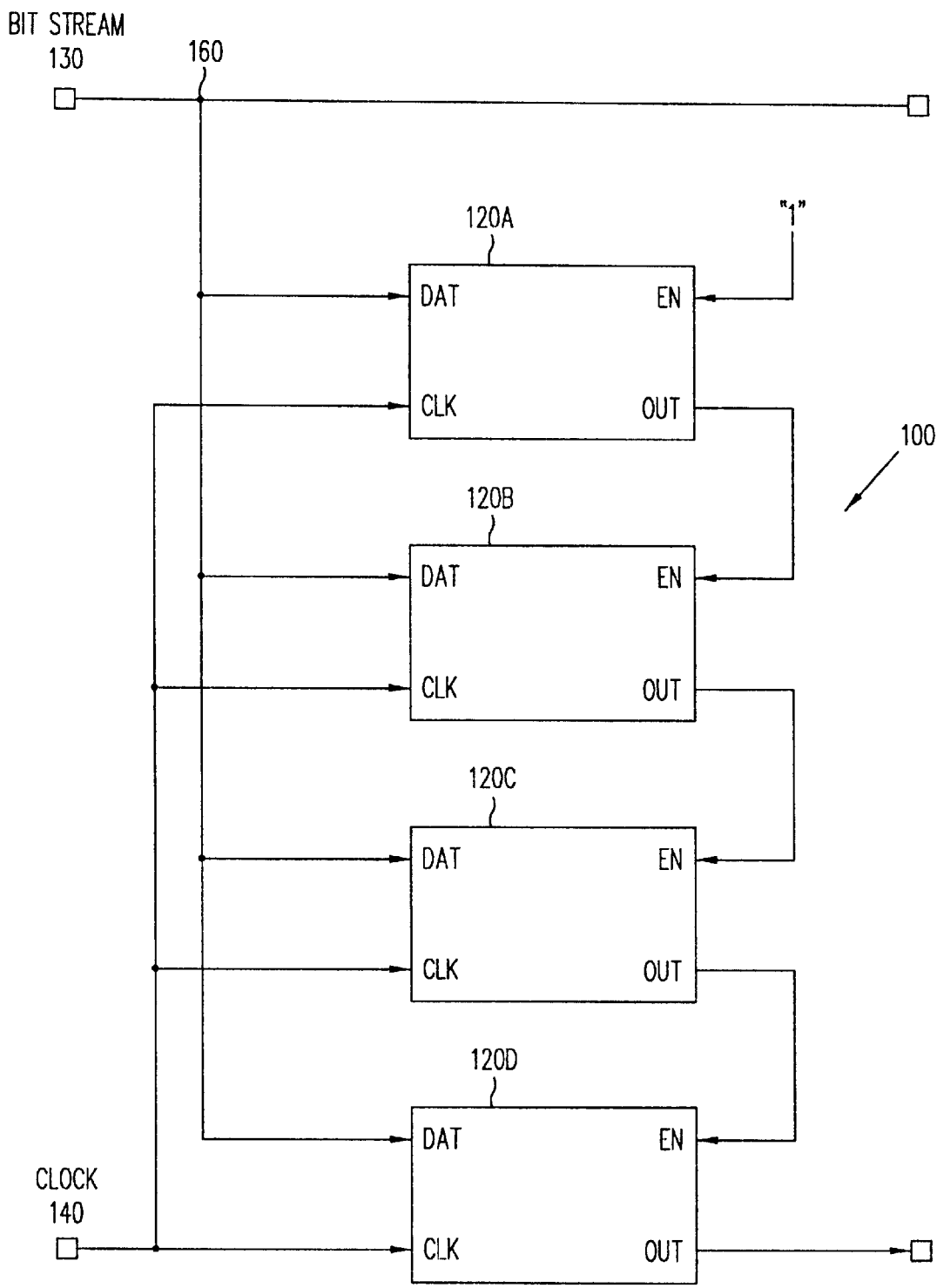
FIG. 1A shows a schematic diagram of a pattern detector in one embodiment.

FIG. 1A shows a schematic diagram of a pattern detector 100 in accordance with one embodiment of the invention. Pattern detector 100 includes multiple single-bit detectors (SBDs) 120 (i.e., SBD 120A, SBD 120B, SBD 120C, and SBD 120D) for detecting bit patterns in a BIT STREAM 130. To detect an n-bit pattern, pattern detector 100 includes n SBDs. In the example of FIG. 1A, four (4) SBDs are employed to detect a 4-bit pattern. SBDs 120 are synchronized by a CLOCK 140, which is in synchronization with BIT STREAM 130. Each of SBDs 120 has a data input terminal (DAT) for receiving a single bit from BIT STREAM 130, a clock terminal (CLK) for receiving CLOCK 140, an enable terminal (EN) for enabling/disabling the SBD, and an output terminal (OUT) for indicating whether the logical value of the bit received from BIT STREAM 130 matches the logical value of the bit expected by the SBD. For example, if an SBD is enabled and expects a "1" (i.e., a logical "1" or a HIGH), the SBD's output terminal will have a "1" if the bit at the SBD's data input terminal is also a "1". Otherwise, the SBD's output terminal will have a "0". Table 1 shows the truth table of SBDs 120 in the example of FIG. 1A.

Note that throughout this disclosure, a "don't care" is denoted with an "X".

TABLE 1

| EN | DAT | Bit Expected By the SBD | OUT |
|---|---|---|---|
| 1 | 0 | 0 | 1 |
| 1 | 0 | 1 | 0 |
| 1 | 1 | 0 | 0 |
| 1 | 1 | 1 | 1 |
| 0 | X | X | 0 |

In Table 1, the logical values in the OUT column indicate the state of the SBD's output terminal after the bit at the SBD's data input terminal is clocked in. An SBD can be implemented using combinational logic, latches, and flip-flops, for example.

As each bit of BIT STREAM 130 arrives at node 160, each bit is compared to the expected bit of one of the SBDs. In the following example, SBD 120A is configured to expect a "1", SBD 120B is configured to expect a "1", SBD 120C is configured to expect a "0", and SBD 120D is configured to expect a "0". Thus, pattern detector 100 looks for a bit pattern "1100" in BIT STREAM 130.

Initially upon power-up of pattern detector 100, SBDs 120B, 120C, and 120D are disabled because their respective output terminals, which initially will have a "0", are connected to the enable terminal of the following SBD. The enable terminal of SBD 120B will also initially have a "0" unless SBD 120A detects a match. Only SBD 120A is enabled and can perform bit detection upon power-up because, unlike SBDs 120B–120D, the enable terminal of SBD 120A is tied to a "1". When a "1" is present at the data input terminal of SBD 120A, its output terminal will have a "1" after the next CLOCK 140 clock cycle. The "1" at the output terminal of SBD 120A is applied to the enable terminal of SBD 120B, thus enabling SBD 120B to detect the next bit of BIT STREAM 130. If the next bit of BITSTREAM 130 is a "1", a "1" will be present at the data input terminal of SBD 120B, resulting in the output terminal of SBD 120B having a "1" after the next CLOCK 140 clock cycle. The "1" at the output terminal of SBD 120B enables SBD 120C to detect the next bit of BIT STREAM 130. If the next bit of BIT STREAM 130 is a "0", a "0" will be present at the data input terminal of SBD 120C, resulting in the output terminal of SBD 120C having a "1" after the next CLOCK 140 clock cycle. The "1" at the output terminal of SBD 120C enables SBD 120D to detect the next bit of BIT STREAM 130. Finally, if the next bit of BIT STREAM 130 is a "0", a "0" will be present at the data input terminal of SBD 120D, resulting in the output terminal of SBD 120D having a "1". A "1" at the output terminal of SBD 120D indicates that the bit pattern "1100" has been detected in BIT STREAM 130. Note that unless the bit pattern "1100" arrives at node 160 in the right order, one of the SBDs will output a "0" at its output terminal, thereby terminating the propagation of "1"s from the output terminal of one SBD to the enable terminal of another.

Figure 1B:
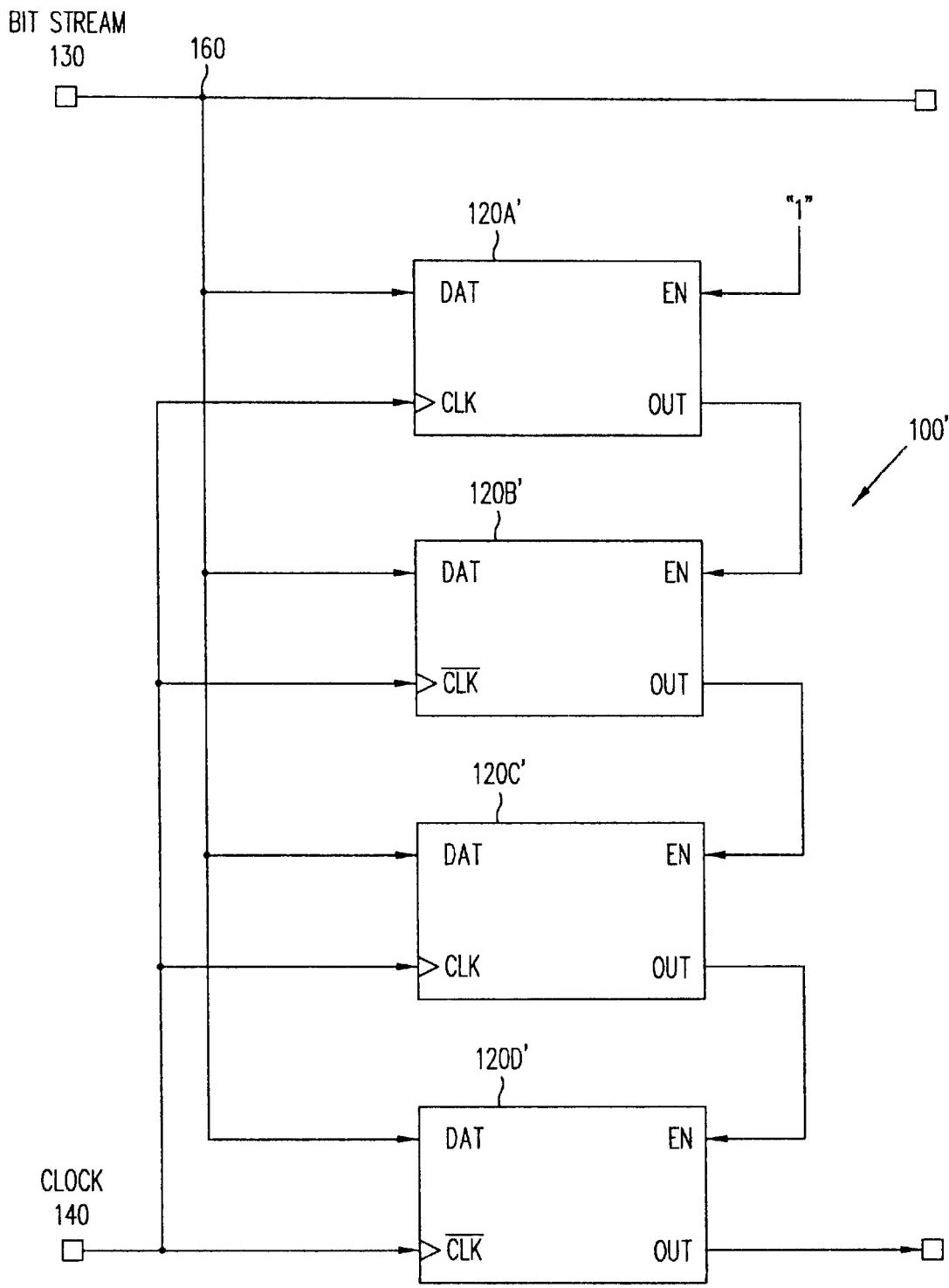
FIG. 1B shows a schematic diagram of a pattern detector in another embodiment.

FIG. 1B shows a schematic diagram of a pattern detector 100' which includes SBDs 120A'–120D'. SBDs 120A'–120D' are essentially the same as SBDs 120A–120D except for their clock terminals. As illustrated in FIG. 1B, the clock terminals of SBD 120A' and SBD 120C' are positive edge triggered while those of SBD 120B' and SBD 120D' are negative edge triggered. Thus, pattern detection is performed on both the rising edge and falling edge of CLOCK 140, thereby allowing pattern detector 100' to utilize a slower CLOCK 140. As can be appreciated by persons skilled in the art, circuits that operate on slower clocks are easier to design and implement.

Figure 2A:
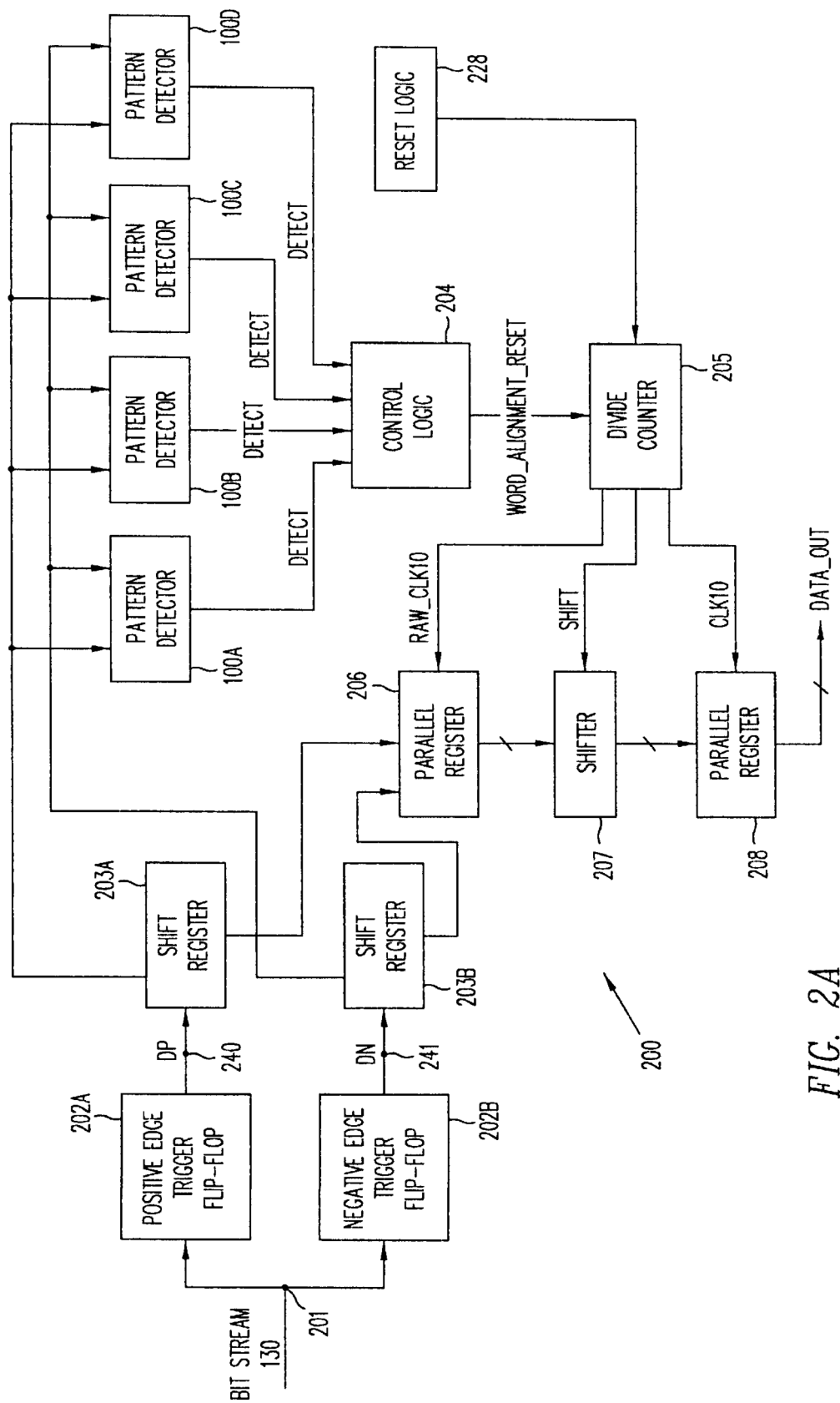
FIG. 2A shows a schematic diagram of an apparatus including a pattern detector in one embodiment.

The present invention is suitable for any application requiring detection of bit patterns in a serial bit stream. For example, pattern detector 100 can be used in a word-aligner 200 shown in the schematic diagram of FIG. 2A. Further details of word-aligner 200 are shown in the logic diagrams of FIGS. 2B–2D. Referring to FIG. 2A, word-aligner 200 receives BIT STREAM 130 on node 201. Pattern detectors 100A, 100B, 100C, and 100D are of the same type as pattern detector 100 and configured to detect bit patterns "0011111XXX" and "1100000XXX", so-called comma patterns, in BIT STREAM 130. Word-aligner 200 looks for a comma pattern in BIT STREAM 130 and then groups the bits following the comma pattern into 10-bit words. Of course, pattern detectors 100A–100D can also be configured to detect any arbitrary pattern.

Figure 3A:
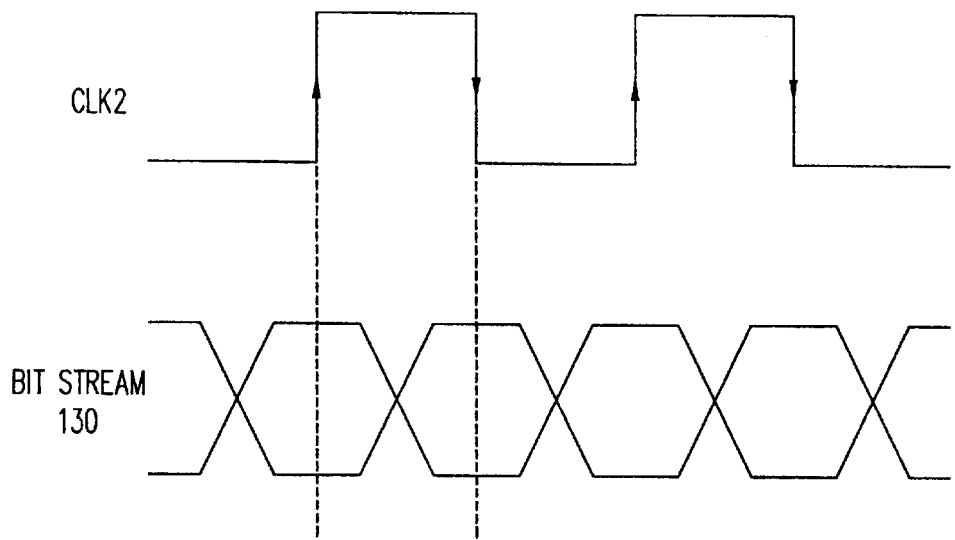
FIGS. 3A–3B show timing diagrams of the apparatus shown in FIG. 2A.
Figure 4:
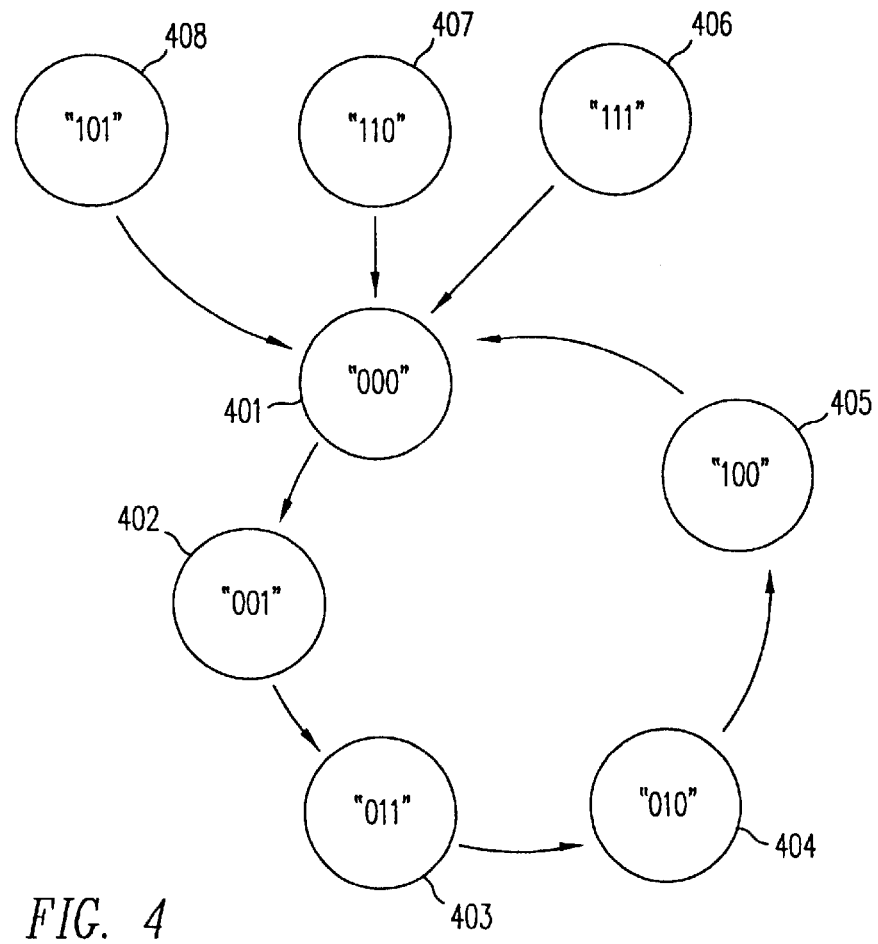

A positive edge-triggered flip-flop 202A and a negative edge-triggered flip-flop 202B, which are synchronized by a clock signal CLK2 (not shown in FIG. 2A), sample BIT STREAM 130 on node 201. As illustrated in the timing diagram of FIG. 3A, the frequency of clock signal CLK2 is half the bit rate of BIT STREAM 130. Flip-flop 202A samples BIT STREAM 130 on the positive edge of clock signal CLK2 and provides the resulting bit stream, bit stream DP ("Data clocked by Positive CLK2 edge"), to a shift register 203A. Similarly, flip-flop 202B samples BIT STREAM 130 on the negative edge of clock signal CLK2 and provides the resulting bit stream, bit stream DN ("Data clocked by Negative CLK2 edge"), to a shift register 203B. Thus, bit streams DP and DN are extracted from BIT STREAM 130 by alternately sampling BIT STREAM 130. For example, a BIT STREAM 130 of "10101010101010" would result in a bit stream DP of "1111111" and a bit stream DN of "0000000". Separating BIT STREAM 130 into bit streams DP and DN reduces the clock frequency requirement of word-aligner 200. Otherwise, a clock frequency that is at least equal to the bit rate of BIT STREAM 130 will be required to synchronize word-aligner 200 (note that the frequency of clock signal CLK2, which is the fastest clock in word-aligner 200, is half the bit rate of BIT STREAM 130 as shown in FIG. 3A).

Referring to FIG. 2A, pattern detectors 100A and 100B are both configured to detect comma pattern "0011111XXX" in BIT STREAM 130. If the first bit (i.e., leftmost "0") of comma pattern "0011111XXX" is in bit stream DP, pattern detector 100A will detect the comma pattern. If the first bit of the comma pattern is in bit stream DN, the comma pattern will be detected by pattern detector 100B. Similarly, pattern detectors 100C and 100D are configured to detect comma pattern "1100000XXX" in BIT STREAM 130. If the first bit (i.e., leftmost "1") of comma pattern "1100000XXX" is in bit stream DN, pattern detector 100C will detect the comma pattern. The comma pattern will be detected by pattern detector 100D if the first bit of the comma pattern is in bit stream DP.

When one of the pattern detectors of word-aligner 200 detects a comma pattern, the pattern detector sends a DETECT signal to a control logic 204 (FIG. 2A), which then outputs a WORD ALIGNMENT RESET signal to reset a divide counter 205. In response, divide counter 205 restarts clock signal RAW_CLK10 to load the bits following the comma pattern (stored in shift registers 203A and 203B) into an 11-bit parallel register 206. A shifter 207 shifts the contents of parallel register 206 depending on which pattern detector detected the comma pattern to compensate for detection delay time. The output of shifter 207 is loaded into a 10-bit parallel register 208 for output as a 10-bit, word-aligned data (DATA OUT). The loading of data bits into parallel register 208 is synchronized by a clock signal CLK10, which is also restarted when divide counter 205 is reset by control logic 204.

Figures 1, 2B:
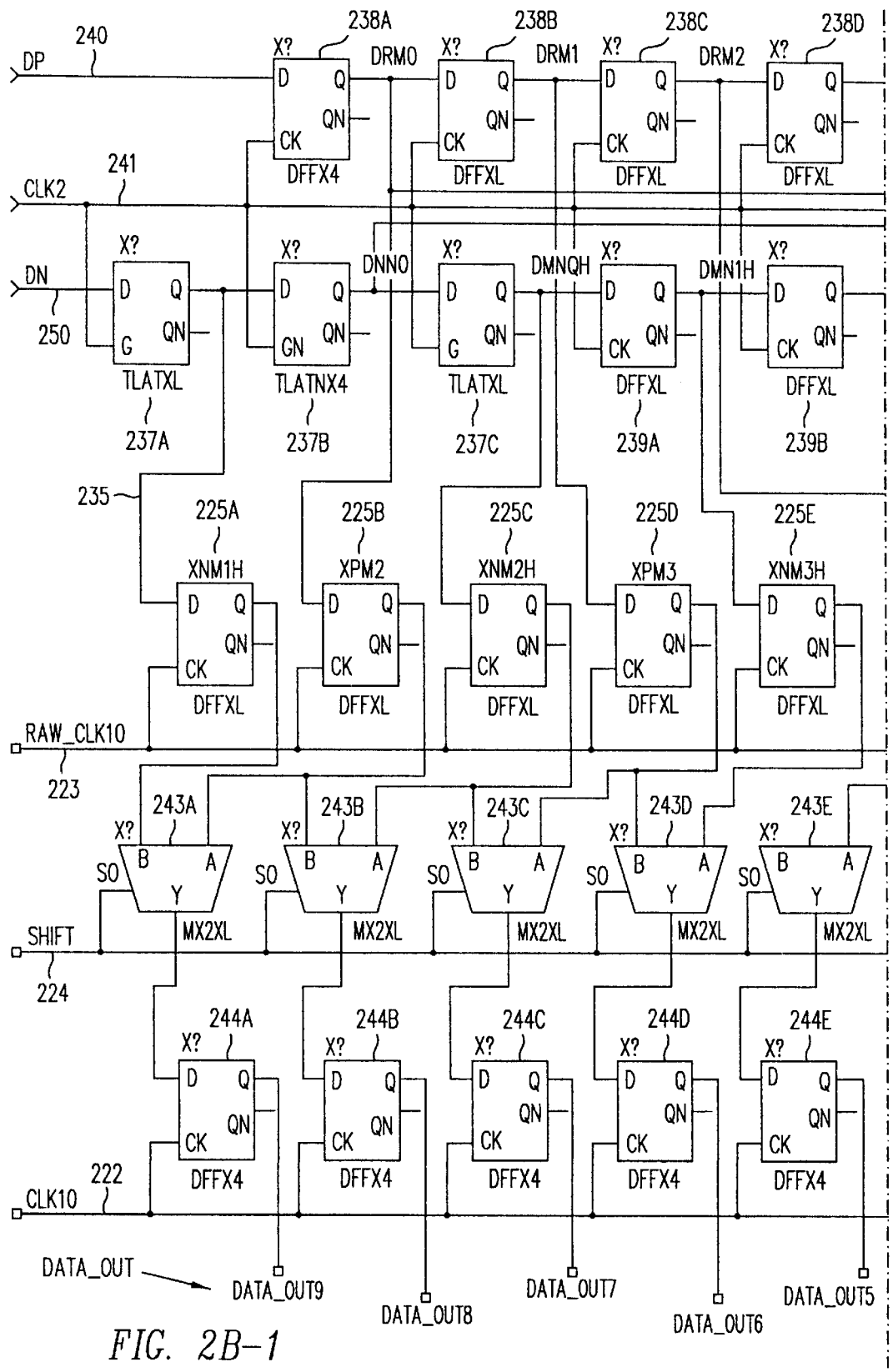
FIGS. 2B–2D show logic diagrams of the apparatus shown in FIG. 2A.
Figures 2, 2B:
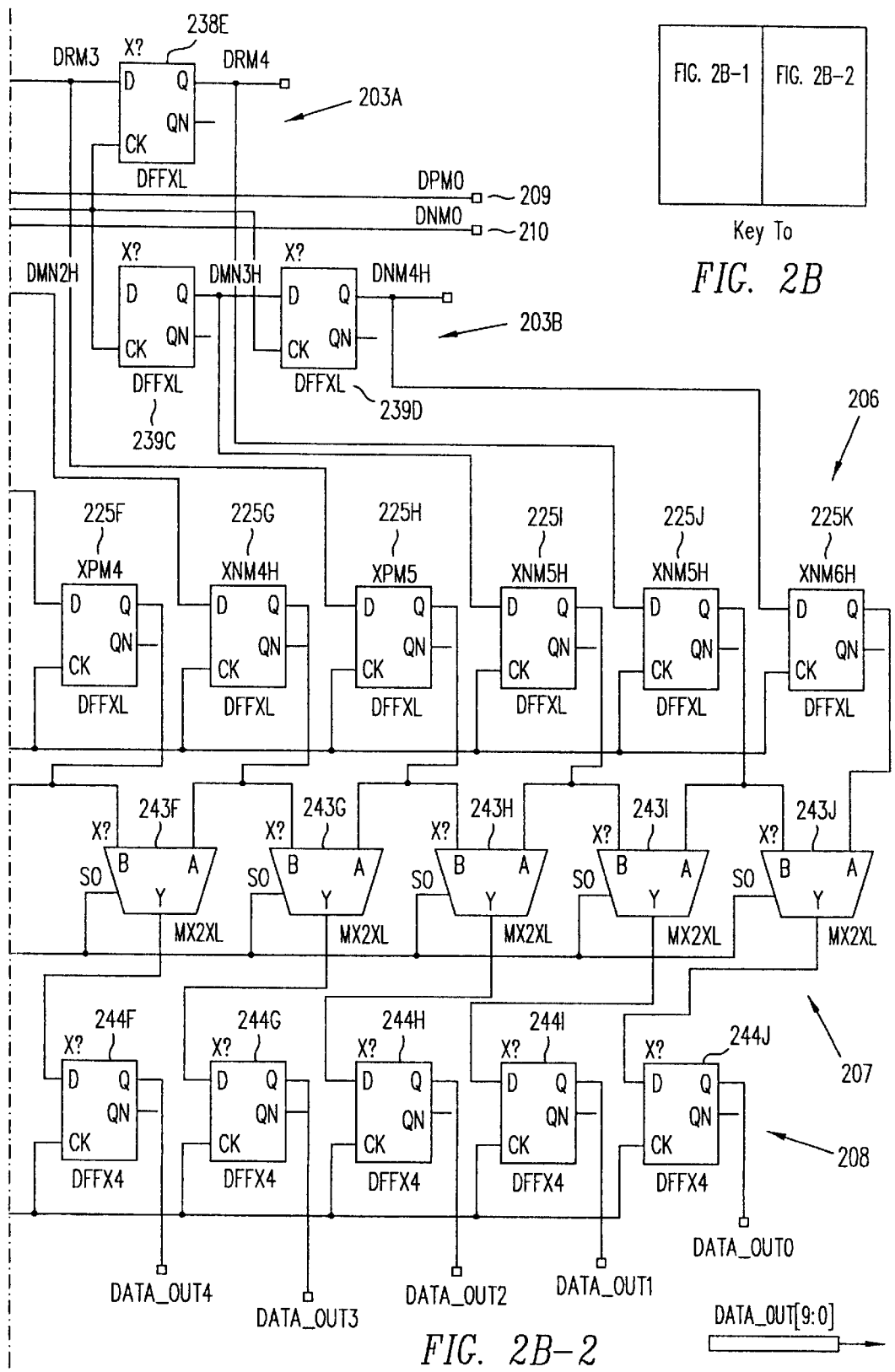
Figures 1, 2C:
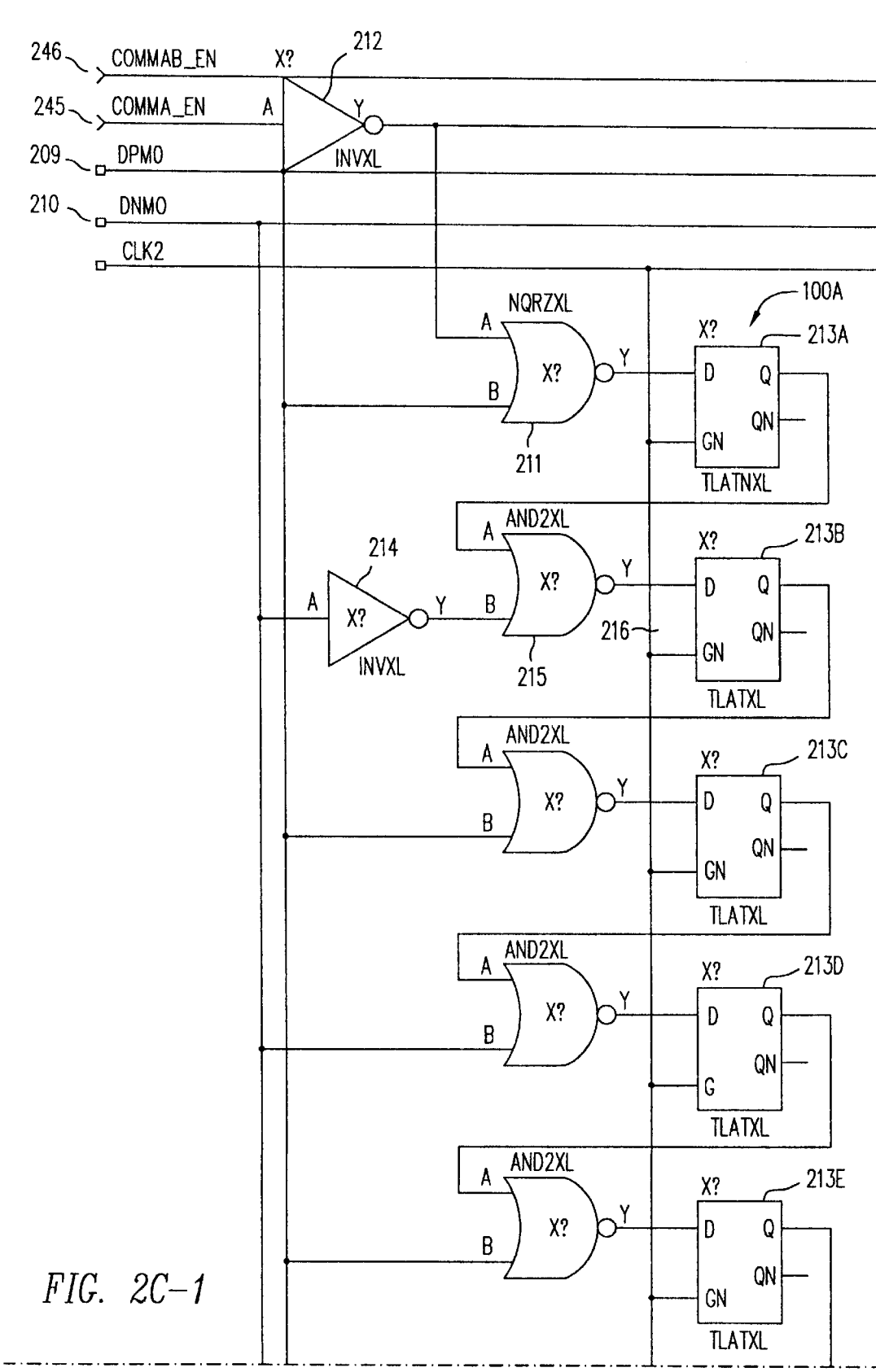
Figures 2, 2C:
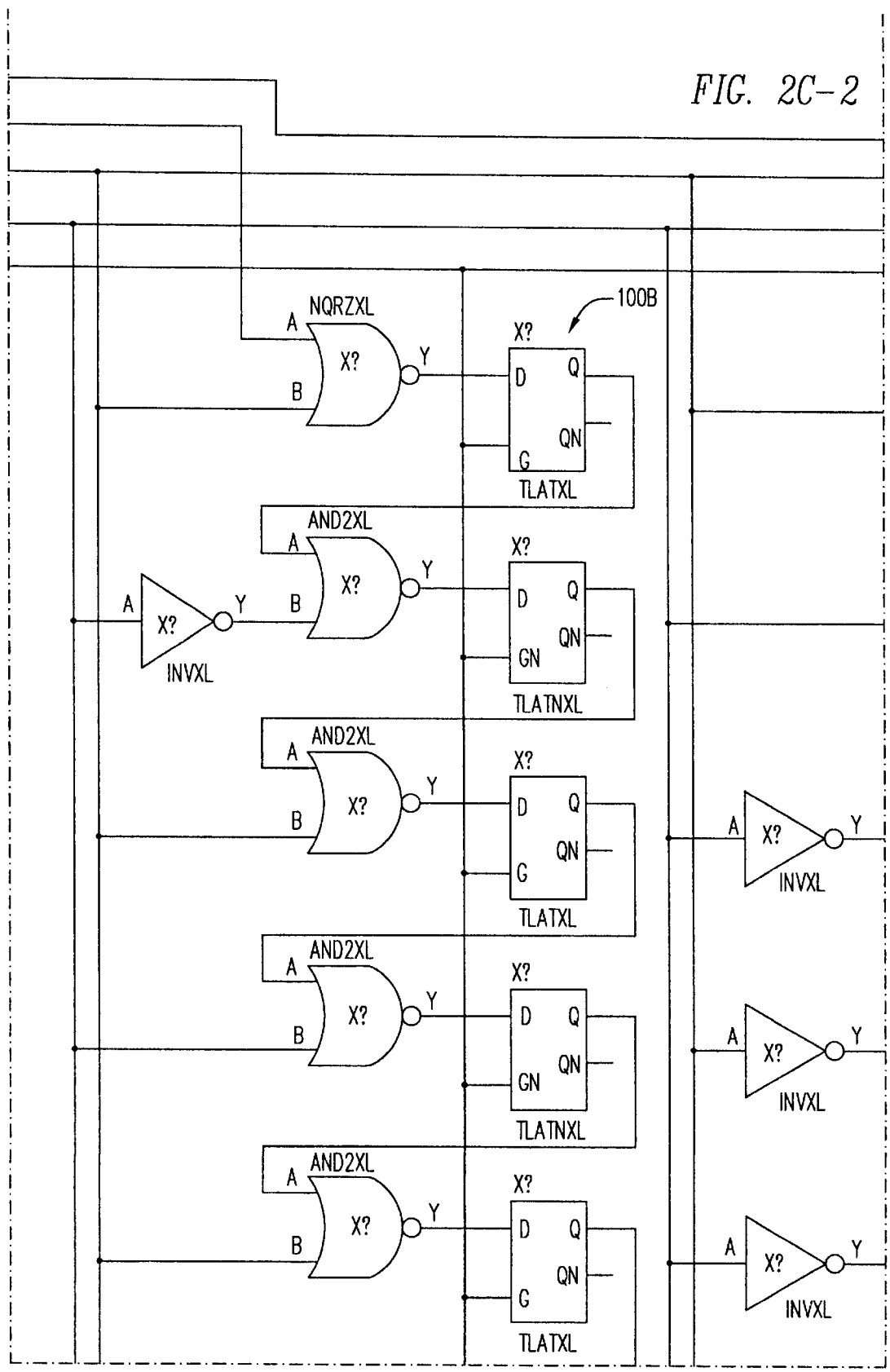
Figures 2, 2C, 3:
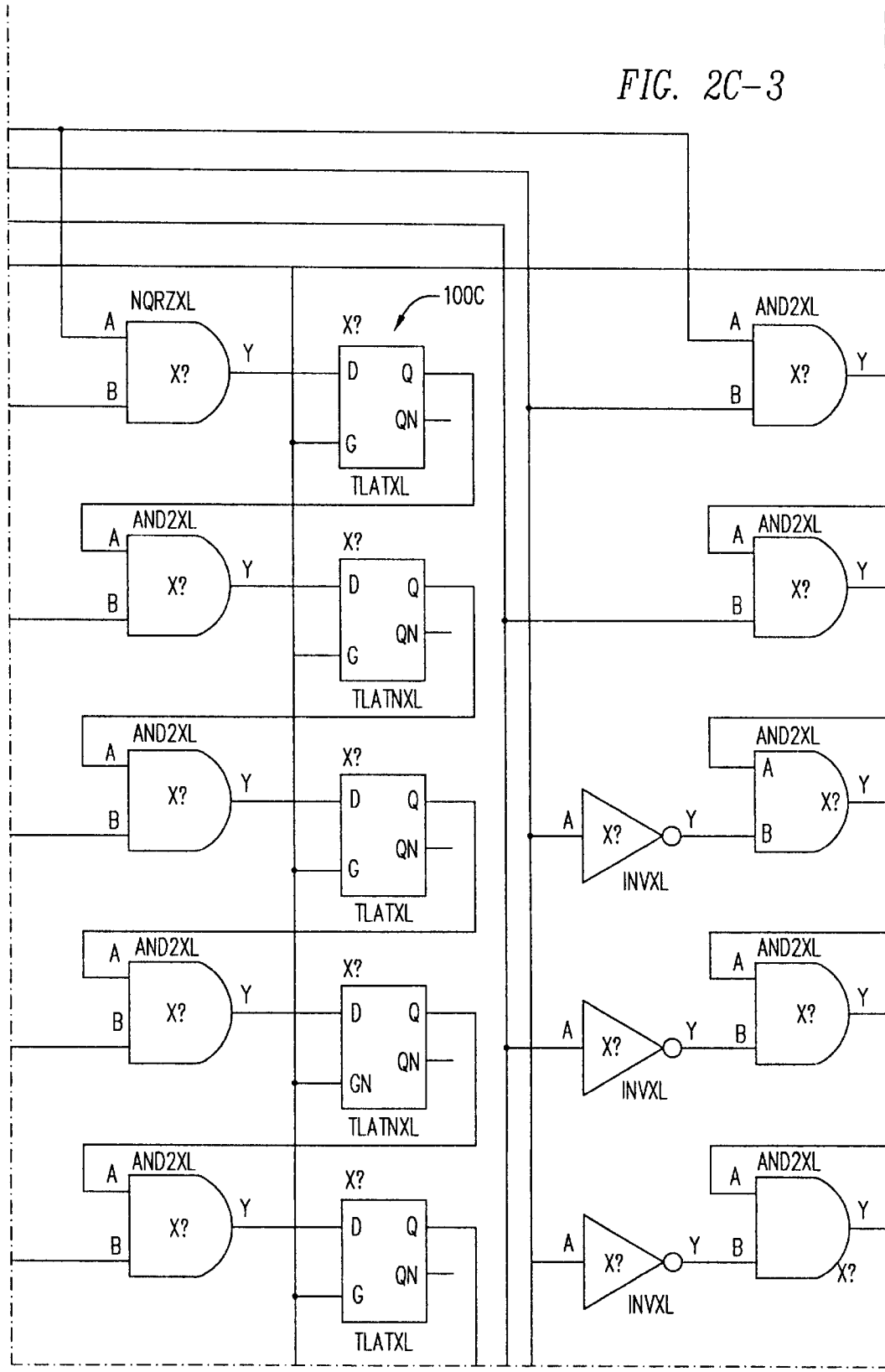
Figures 2, 2C, 3, 4, 5:
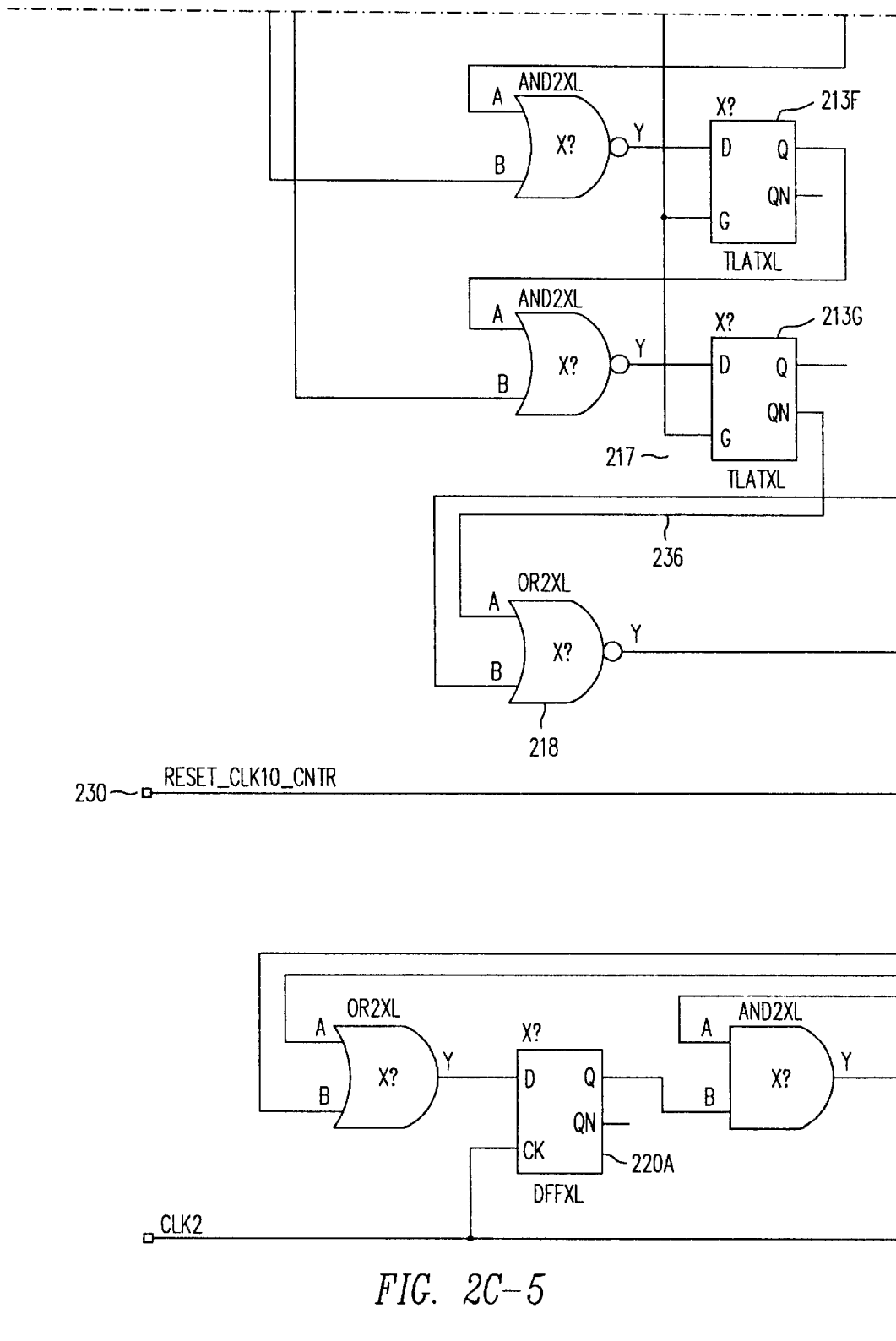
FIG. 4 shows a state diagram of a reset logic in the apparatus shown in FIG. 2A.
Figures 2, 2C, 3, 4, 5, 6:
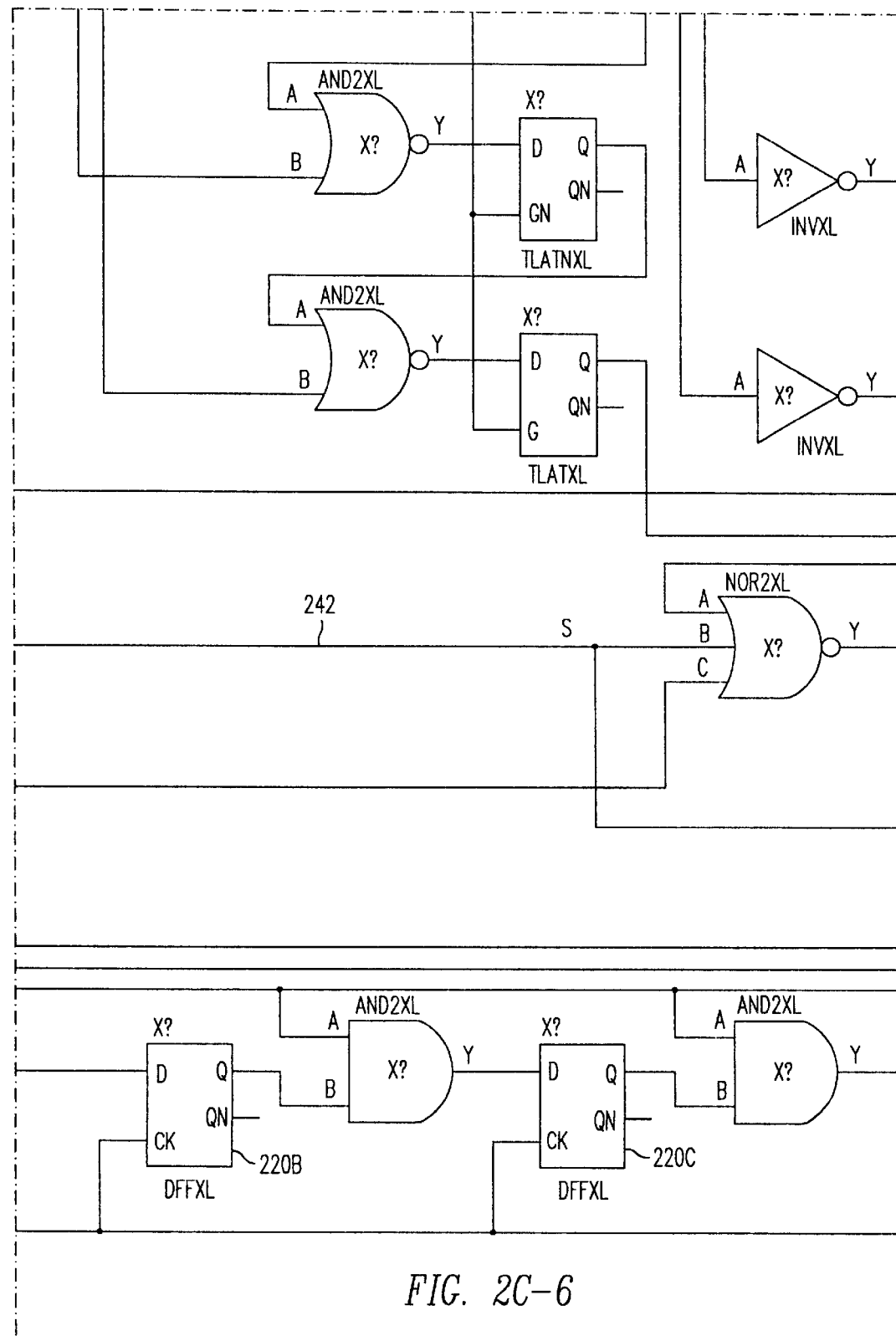
Figures 2, 2C, 3, 4, 5, 6, 7:
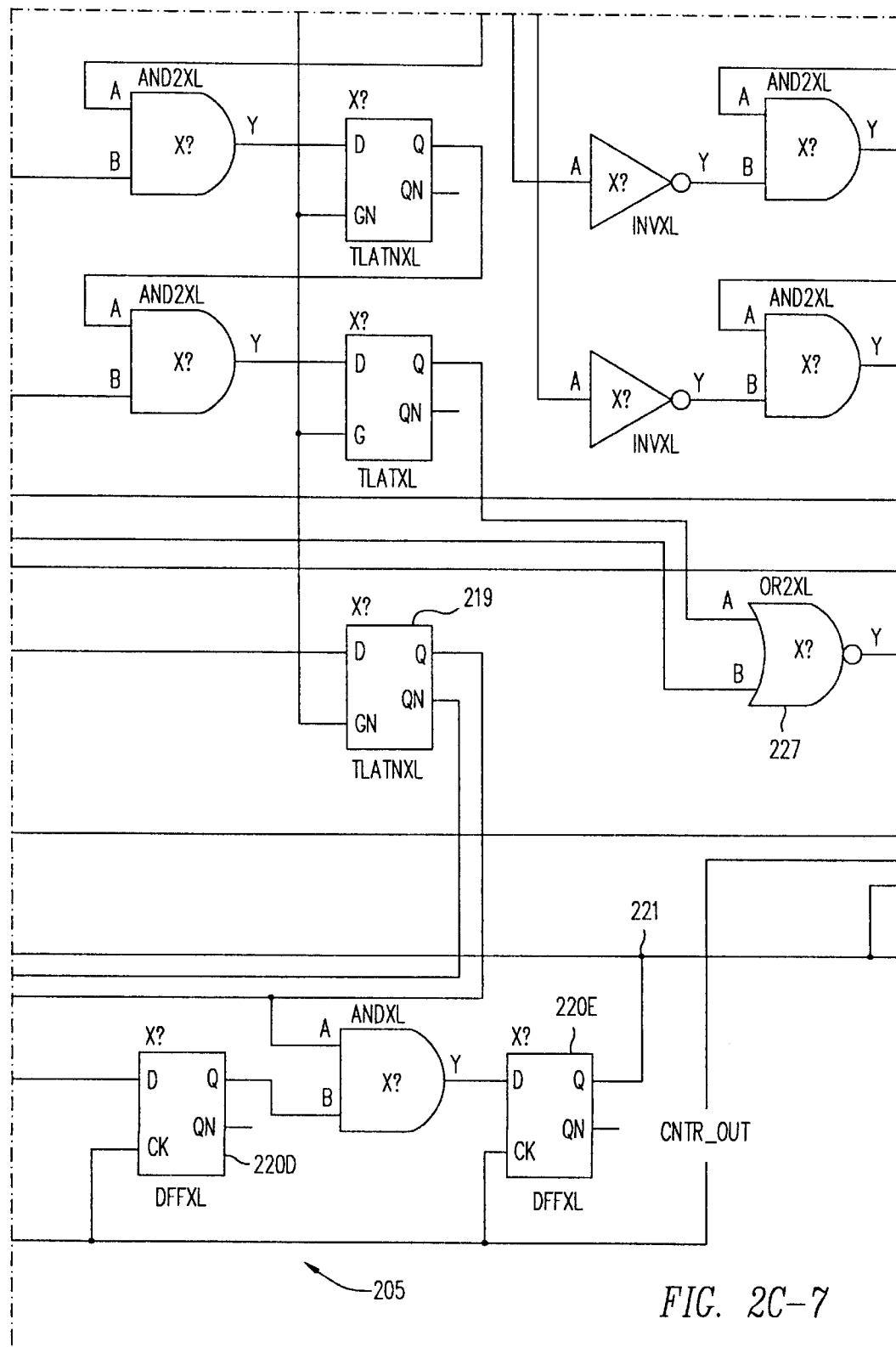
Figures 2, 2C, 3, 4, 5, 6, 7, 8:
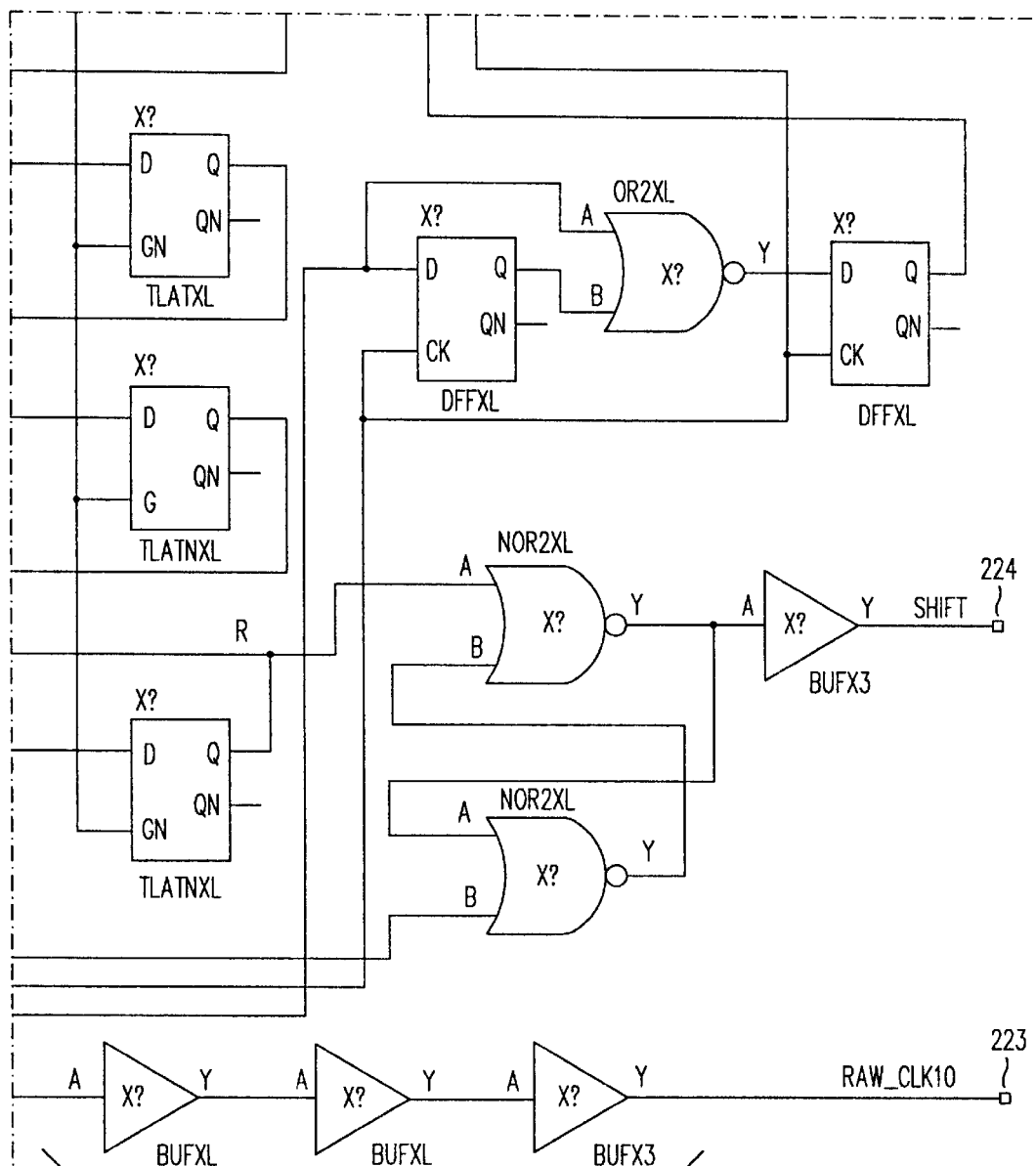
Figure 2D:
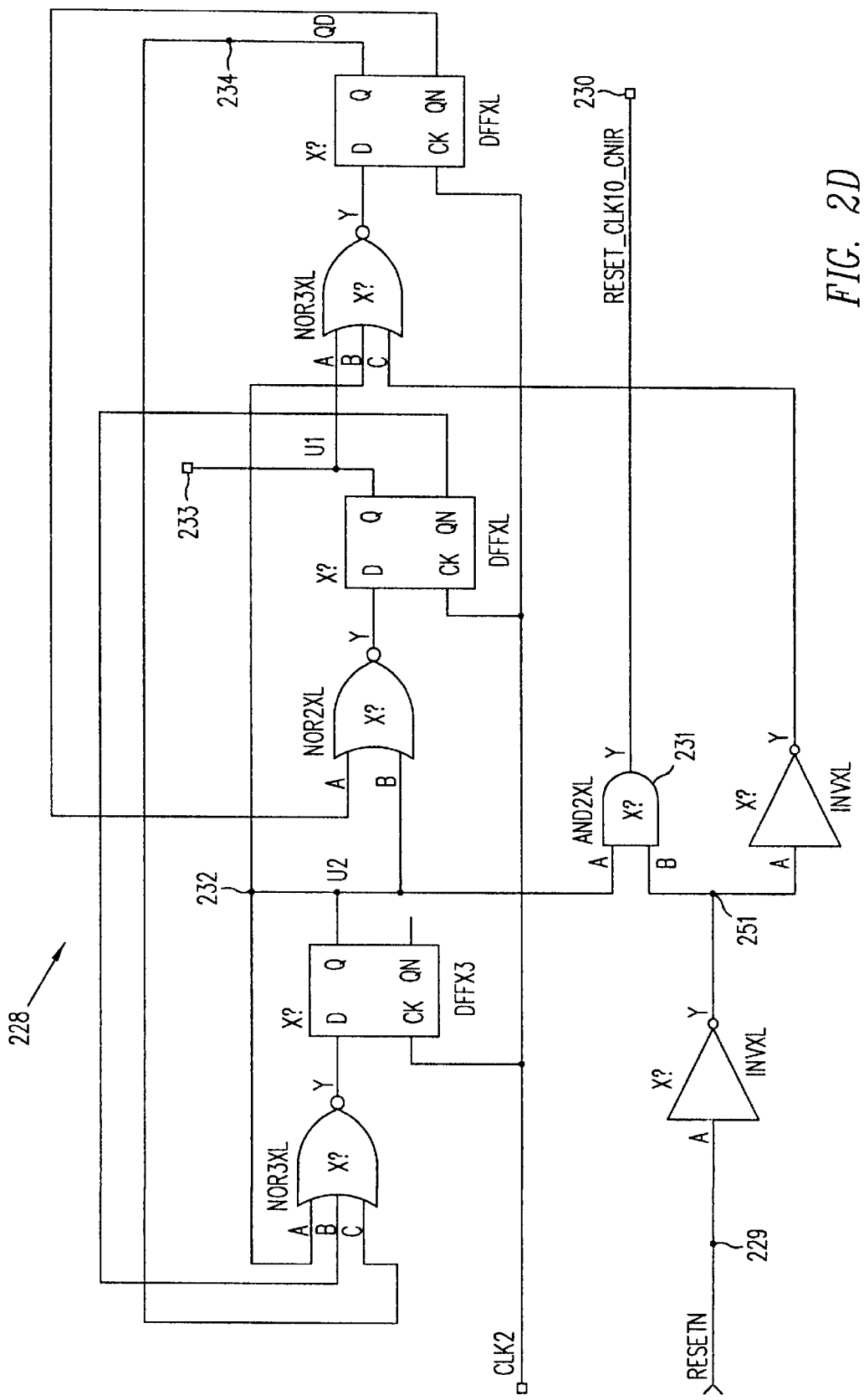

FIGS. 2B–2D show logic diagrams of word-aligner 200 in one embodiment. As shown in FIG. 2B, shifter 203A includes D-type flip-flops 238A–238E. Bit stream DP is sampled by pattern detectors 100A–100D at node 209, which is one flip-flop (and hence one CLK2 clock cycle) away from node 240. In this specific example, bit stream DP is not sampled directly at node 240 because node 240 has heavy electrical loading and may not be able to supply adequate electrical current to drive pattern detectors 100A–100D.

Shifter 203B includes T-type latches 237A–237C and D-type flip flops 239A–239D. As is well known, two T-type latches can be connected in sequence to create a timing delay that is equivalent to that of a single D-type flip-flop (i.e., a T-type latch takes half the time it takes a D-type flip-flop to load data in). By using T-type latch 237A instead of a D-type flip-flop, bit stream DN is delayed by half a CLK2 clock cycle on node 235, thereby synchronizing the output of T-type latch 237A with the positive edge of clock signal CLK2. This compensates for the skewing that results from extracting bit streams DN and DP from BIT STREAM 130 on different edges of clock signal CLK2. Thus, the outputs of shifters 203A and 203B, together, can be properly loaded into parallel register 206 as a word of BIT STREAM 130. In this specific example, bit stream DN is sampled by pattern detectors 100A–100D at node 210, which is two T-type latches (i.e., one CLK2 clock cycle) away from node 250 because of the heavy electrical loading on node 250.

Referring to FIG. 2C, pattern detector 100A includes seven (7) T-type latches 213 to detect comma pattern "0011111XXX". Only seven (7) T-type latches are needed because the last three bits of the comma pattern are "don't-cares". The combinational logic driving the data input terminal of each T-type latch of pattern detector 100A is configurable to detect a "1" or a "0" depending on the expected data bit. In FIGS. 2B–2D, a clock terminal "GN" of a T-type latch indicates that the T-type latch loads-in a data bit present at its data terminal input ("D" terminal) during the negative clock cycle whereas a clock terminal "G" indicates that the data bit is loaded-in during the positive clock cycle. In pattern detector 100A, T-type latches 213A, 213C, 213E, and 213G, each of which has a clock terminal "GN", load-in the data bit present at their respective D-terminals on the negative clock cycle of clock signal CLK2. T-type latches 213B, 213D, and 213F, each of which has a clock terminal "G", load-in the data bit present at their respective D-terminals on the positive clock cycle of clock signal CLK2. Loading-in data bits during both the positive and negative cycles of clock signal CLK2 enables pattern detector 100A to operate at half the it rate of BIT STREAM 130.

NOR-gate 211 and T-type latch 213 form the first single-bit detector of pattern detector 100A. One input of NOR-gate 211 is coupled to a COMMA_EN signal on node 245 to enable/disable detection of comma pattern "0011111XXX". The other input of NOR-gate 211 is coupled to node 209 to detect the first bit of the comma pattern, which is a "0" in this example. Detection of comma pattern "0011111XXX" is enabled by setting the COMMA_EN signal to a "1". Thereafter, a "0" on node 209 results in NOR-gate 211 outputting a "1" to the D-terminal of T-type latch 213, which then outputs a "1" on its normal output terminal ("Q" terminal) on the next negative CLK2 clock cycle. This enables the next single-bit detector consisting of inverter 214, AND-gate 215, and T-type latch 216 to detect the next bit of the comma pattern on node 210. Thus, if the bit on node 210 on the following positive CLK2 clock cycle is a "0", latch 216 will output a "1" on its Q-terminal to enable the next single-bit detector to detect the next bit of the comma pattern, which is a "1", on node 209. As is evident from FIG. 2C, a comma pattern "0011111XXX" that alternately arrives on nodes 209 and 210 propagates a "1" from the Q-terminal of latch 213A down to the Q-terminal of latch 213G. A "1" on the Q-terminal of latch 213G indicates that the comma pattern "0011111XXX" has been detected by pattern detector 100A. Similarly, pattern detectors 100B, 100C, and 100D are configured to detect their respective comma patterns. In FIG. 2C, a COMMAB_EN signal on node 246 is used to enable/disable detection of comma pattern "1100000XXX".

A "1" on the output of OR-gate 218 (node 242; shown on the lower left portion of FIG. 2C) indicates that a comma pattern whose first bit is in bit stream DP was detected by either pattern detector 100A or pattern detector 100D. This causes T-type latch 219 to output a "0" on its Q-terminal and a "1" on its complement output terminal (depicted as "QN"; also known as Q̄-terminal), thereby resetting all flip-flops of divide counter 205 except flip-flop 220A. In this example, counter 205 is a divide-by-five "one-hot" counter which includes D-type flip-flops 220A–220E. Similarly, a "1" on the output of OR-gate 227 (shown on the lower right portion of FIG. 2C) indicates that a comma pattern whose first bit is in bit stream DN was detected by either pattern detector 100B or pattern detector 100C, and causes all flip-flops of counter 205 to be reset except flip-flop 220A. Because only one of flip-flops 220A–220E has a "1" on its Q-terminal at any given time and because clock signal CLK2 synchronizes flip-flops 220A–220E, the output node of counter 205 on node 221 will have a "1" once every five (5) CLK2 clock cycles. Clock signals CLK10 and RAW_CLK10 on nodes 222 and 223, respectively, are derived from counter 205. Clock signal RAW_CLK10 is delayed by three buffers to meet the set-up time requirement of parallel register 206 (FIG. 2B). Clock signal CLK10 on node 222 is one CLK2 clock cycle away from clock signal RAW_CLK10 on node 223 to ensure that the contents of parallel register 206 are stable by the time they are loaded into parallel register 208 (FIG. 2B).

Referring to FIG. 2B, clock signal RAW_CLK10 on node 223 synchronizes the loading of the contents of shift registers 203A and 203B into parallel register 206 once every five (5) CLK2 clock cycles. Five (5) CLK2 clock cycles are needed to load 10-bits of BIT STREAM 130 into shift registers 203A and 203B because two (2) bits of BIT STREAM 130 are sampled every one (1) CLK2 clock cycle (see FIG. 3A). By restarting clock signal RAW_CLK10 upon detection of a comma pattern, the bits following the comma pattern are loaded into parallel register 206 eleven (11) bits at a time. The output terminals of D-type flip-flops 225A–225K, which form register 206, are connected to the input terminals of multiplexers 243A–243J of shifter 207 as illustrated in FIG. 2B. If the first bit of the comma pattern is in bit stream DP (i.e., the comma pattern was first detected by either pattern detector 100A or 100D), node 224 in FIG. 2C is driven to a "1", thereby causing the data bits at the "B" input terminals of multiplexers 243A–243J to be output to their respective Y-Terminals. This results in the contents of flip-flops 225A–225J of parallel register 206 being loaded into flip-flops 244A–244J of parallel register 208. Similarly, if the first bit of the comma pattern is in bit stream DN (i.e., the comma pattern was first detected by either pattern detector 100B or 100C), node 224 will be driven to a "0", thereby causing the data bits at the "A" input terminals of multiplexers 243A–243J to be output to their respective Y-Terminals, resulting in the contents of flip-flops 225B–225K being loaded into flip-flops 244A–244J. Multiplexers 243A–243J of shifter 207 are used to adjust word alignment by one bit because, in this particular example, the first 10-bits following the comma pattern may be in flip-flops 225A–225J or in flip-flops 225B–225K by the time the comma pattern is detected. The data bits at the output terminals of multiplexers 243A–243J are loaded into parallel register 208 by clock signal CLK10 on node 222. The above sequence of events result in a 10-bit, word-aligned data at the output of register 208 every CLK10 clock cycle.

FIG. 2D shows a logic diagram of reset logic 228 (FIG. 2A) for resetting counter 205. To initiate the reset, an external source (e.g., a start-up circuit; not shown) applies a "0" on node 229 thereby causing a "1" to be applied on an input of AND-gate 231 on node 251. A "1" on node 232, together with the "1" on node 251, causes AND-gate 231 to output a "1" on node 230, thereby resetting counter 205.

FIG. 4 shows the state diagram of reset logic 228. Each state in FIG. 4 takes one (1) CLK2 clock cycle because clock signal CLK2 synchronizes the flip-flops driving nodes 232–234. In each state shown in FIG. 4, the logical value of node 232 is the leftmost bit, that of node 233 is the middle bit, and that of node 234 is the rightmost bit. For example, state 403 ("011") is the state where a "0" is on node 232, a "1" is on node 233, and a "1" is on node 234. When reset logic 228 is in states 405, 406, 407, or 408 (i.e., the states where a "1" is on node 232), counter 205 can be reset by applying a "0" on node 229 as discussed above. As shown in FIG. 4, it takes a maximum of four (4) CLK2 clock cycles to reach a state where a "1" is on node 232. For example, if reset logic 228 is in state 401 upon power-up, it has to cycle through states 402, 403, and 404, to reach state 405. Thus, a "0" needs to be applied on node 229 for at least four (4) CLK2 clock cycles to properly reset counter 205.

Figures 2, 3B:
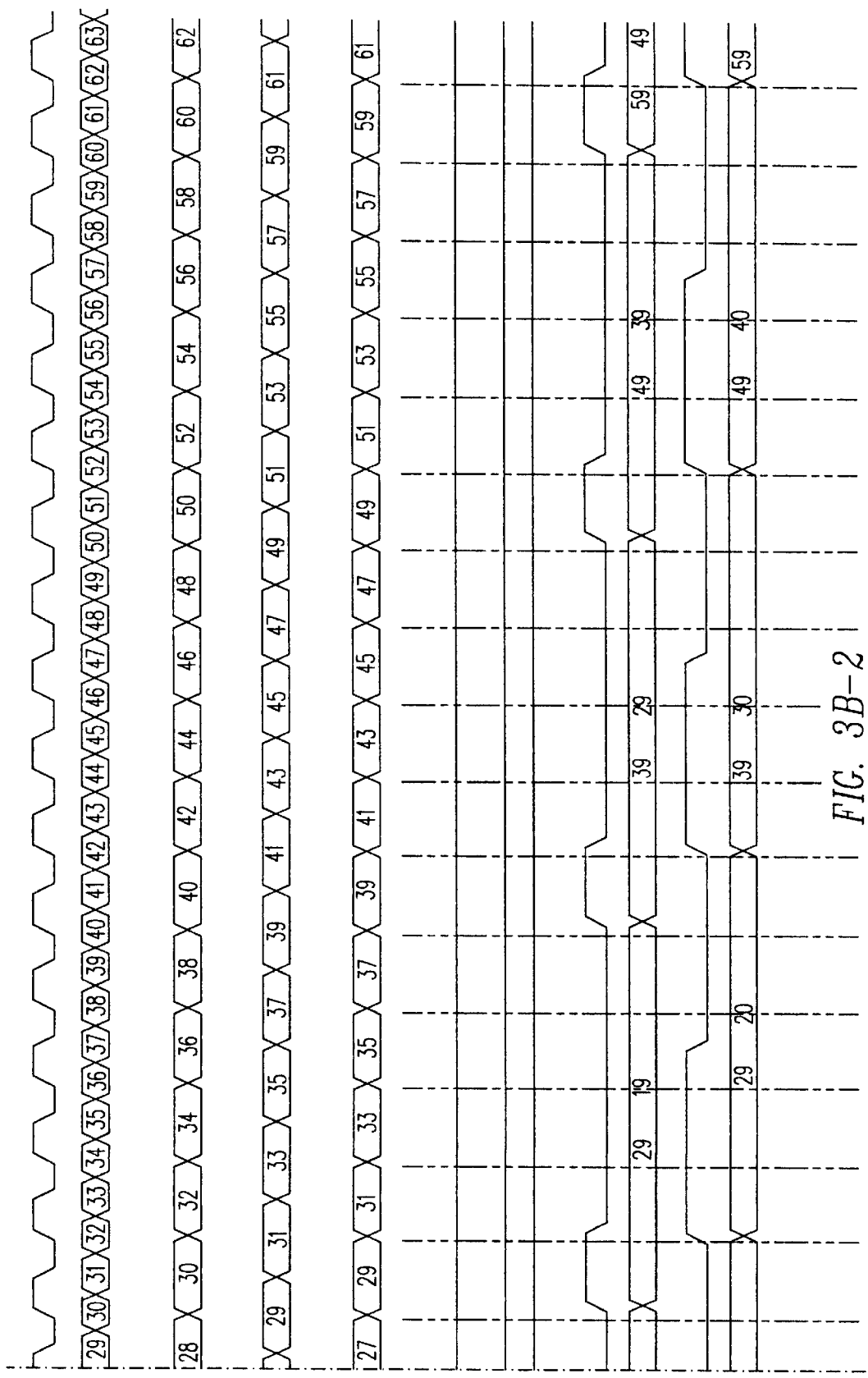

An example operation of word aligner 200 is now illustrated with reference to the timing diagram of FIG. 3B, where the direction of increasing time is from left to right. In this specific example, the comma pattern to be detected, "0011111XXX", is in bit positions 10–19 of BIT STREAM 130. As shown in FIG. 3B, the even-numbered and oddnumbered bit positions of BIT STREAM 130 are separated into bit streams DP and DN, respectively. When the last significant bit of the comma pattern (i.e., the "1" in bit position 16 of bit stream DP) is detected by the last single-bit detector of pattern detector 100A, nodes 236 and 242 (FIG. 2C) are driven to a "1" indicating that a comma pattern whose first bit is in bit stream DP has been detected. Because bit stream DP is sampled after the first flip-flop of shift register 203A, the "1"s on nodes 236 and 242 are one (1) CLK2 clock cycle away from bit position 16 of bit stream DP. The "1" on node 242 resets counter 205, resulting in clock signal RAW_CLK10 restarting after five (5) CLK2 clock cycles and clock signal CLK10 restarting after six (6) CLK2 clock cycles. The restarted RAW_CLK10 clock cycle loads bit positions 19–29 into parallel register 206. The "1" on node 242 also results in a "1" on node 224 (SHIFT), thereby causing shifter 207 to pass bit positions 20–29 into parallel register 208 at the restarted CLK10 clock cycle. Thus, the bits following the comma pattern are aligned at the output of parallel register 208 as 10-bit words grouped as bits of bit positions 20–29, bits of bit positions 30–39, bits of bit positions 40–49, and so on.

While specific embodiments of this invention have been described, it is to be understood that these embodiments are illustrative and not limiting. Many additional embodiments that are within the broad principles of this invention will be apparent to persons skilled in the art.

What is claimed is:

1. An apparatus for detecting a bit pattern in a serial bit stream comprising:
    a first detector having a data input terminal coupled to sample said serial bit stream, said first detector having an output terminal which provides a first detection signal when a bit of said bit stream matches a first predetermined logical value; and
    a second detector having a data input terminal coupled to sample said serial bit stream, said second detector having an output terminal which provides a second detection signal when a bit of said serial bit stream matches a second predetermined logical value and said first detection signal is provided to said second detector.

2. The apparatus of claim 1 wherein said first detector and said second detector are synchronized by different phases of a clock signal.

3. The apparatus of claim 1 wherein said first detector includes combinational logic coupled to a single-bit memory device.

4. The apparatus of claim 3 wherein said single bit memory device is selected from a group consisting of T-type latch and D-type flip-flop.

5. An apparatus for aligning words in a serial bit stream comprising:
    (a) a shift register coupled to receive said bit stream;
    (b) a pattern detector, said pattern detector comprising:
        (i) a first single-bit detector ("SBD") having a data input terminal coupled to read said bit stream one bit at a time, said first SBD having an output terminal which provides a first detection signal when a bit of said bit stream matches a first bit of a predetermined pattern; and
        (ii) a second SBD having a data input terminal coupled to read said bit stream one bit at a time, said second SBD having an output terminal which provides a second detection signal when a bit of said bit stream matches a second bit of said predetermined pattern and said first detection signal is provided to said second SBD;
    (c) a parallel register coupled to receive the contents of said shift register, said parallel register storing word-aligned data when said pattern detector detects all bits of said predetermined pattern in said bit stream.

6. The apparatus of claim 5 wherein said first SBD includes combinational logic coupled to a single bit memory device.

7. The apparatus of claim 6 wherein said single bit memory device is selected from a group consisting of T-type latch and D-type flip-flop.

8. The apparatus of claim 5 wherein said first SBD and said second SBD are synchronized by different portions of a clock signal.

* * * * *